Figure 1:
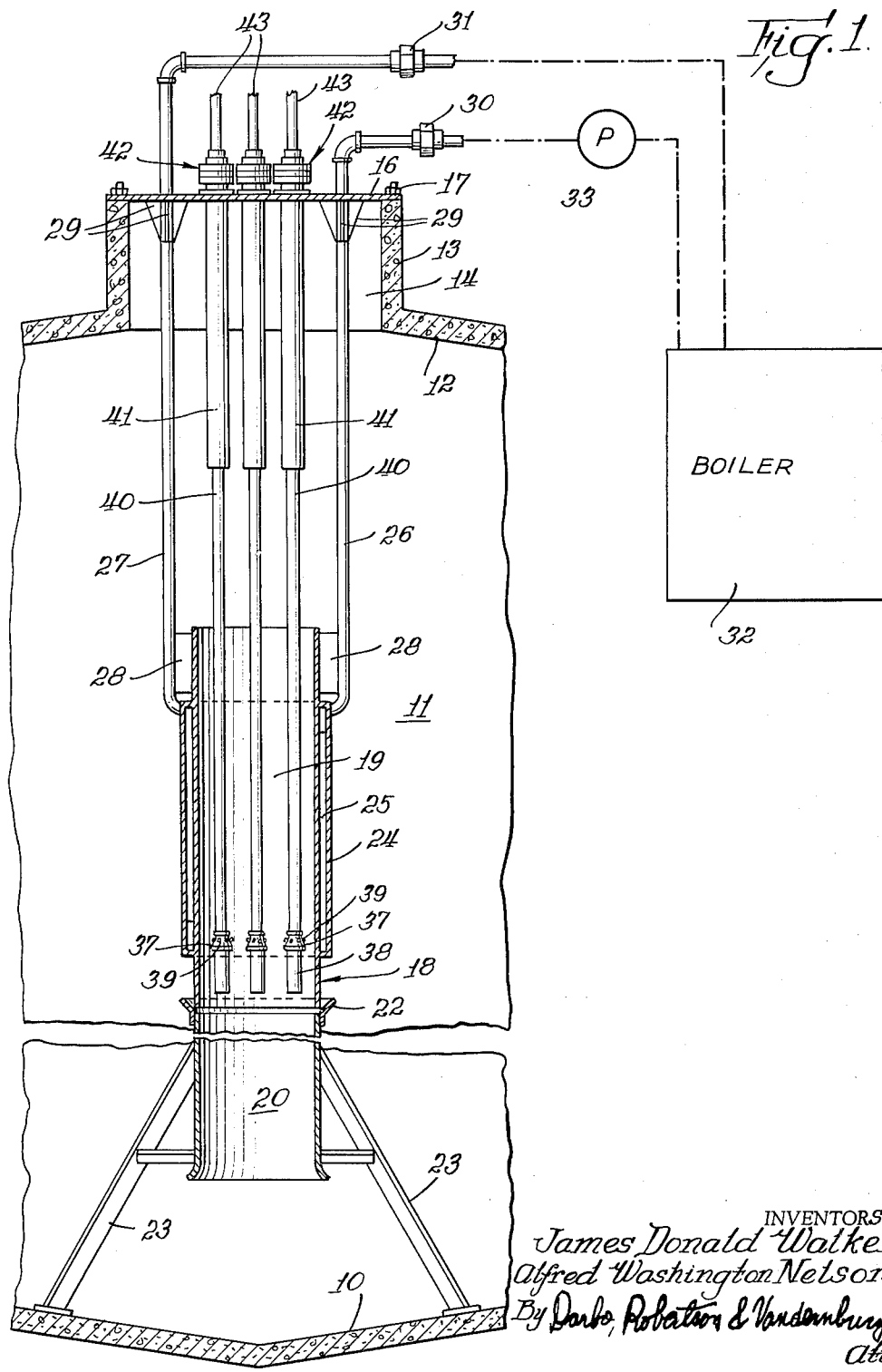

June 14, 1966  J. D. WALKER ETAL  3,255,887
SLUDGE DIGESTER

Filed Feb. 18, 1963  2 Sheets-Sheet 1

INVENTORS
James Donald Walker &
Alfred Washington Nelson
By Darbo, Robatson & Vandenburgh
attys.

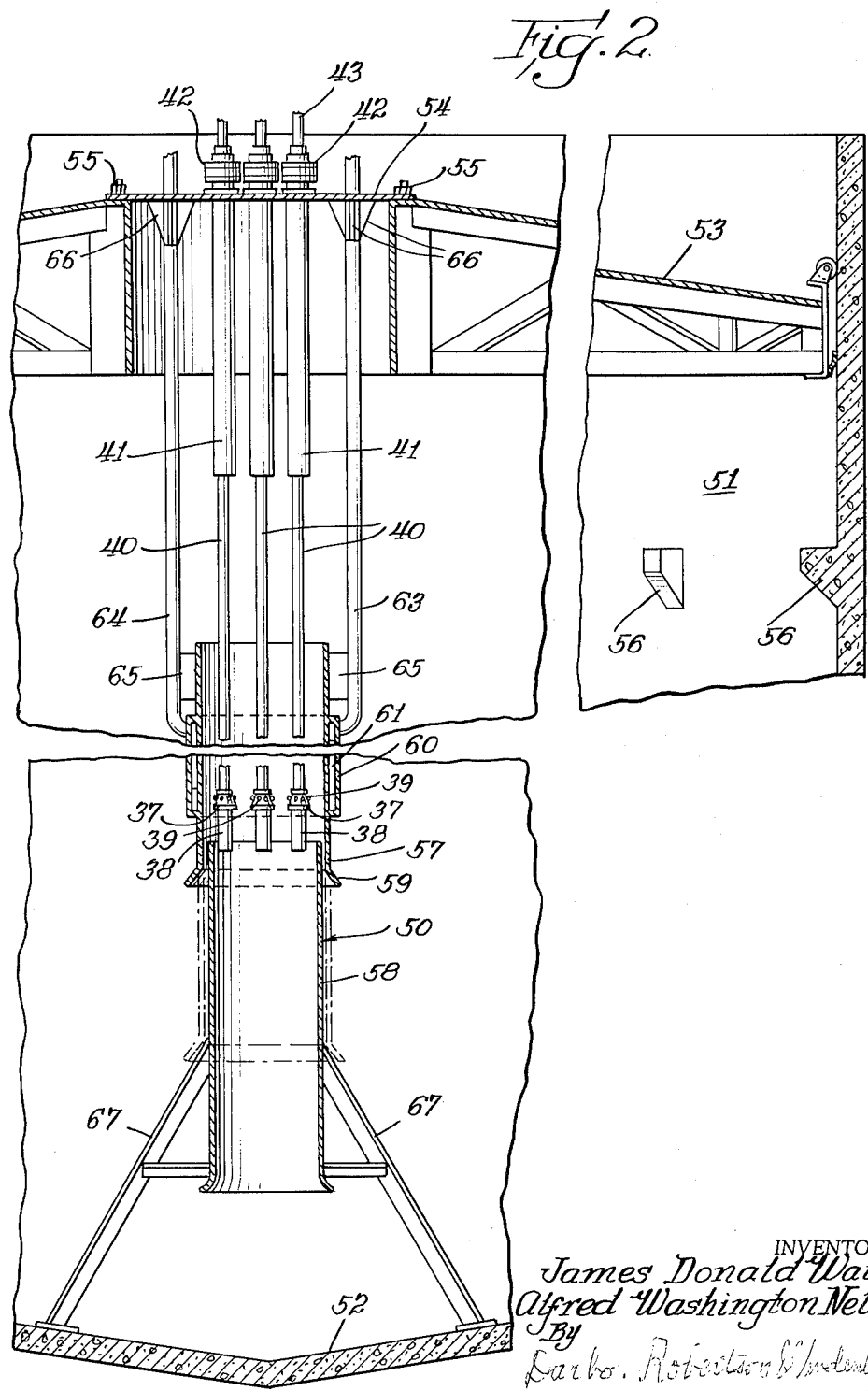

United States Patent Office 3,255,887
Patented June 14, 1966

3,255,887
SLUDGE DIGESTER
James Donald Walker, Aurora, and Alfred Washington Nelson, Batavia, Ill., assignors, by mesne assignments, to Walker Process Equipment Inc., Wilmington, Del., a corporation of Delaware
Filed Feb. 18, 1963, Ser. No. 259,738
6 Claims. (Cl. 210—187)

The present invention relates to improvements in sludge digesters such as are commonly found in sewage treatment plants, particularly those requiring the heating of sludge, and the following disclosure of the invention is offered for public dissemination upon the grant of a patent therefor.

The great bulk of sewage flowing into a sewage treatment plant flows out again a nearly crystal clear water, called the plant effluent. The solids, including dissolved solids are left behind in a form called sludge. Sludge must be digested before it can be disposed of without being a nuisance.

The digestion takes place in huge tanks called digesters. The amount of sludge a digester can digest depends in part on its temperature. Digesters perform much less effectively as the temperature falls substantially below about 85° F., and even higher temperatures are required for the most effective bacterial action. Thus, especially in areas having a relatively cool or cold temperature, it is important that heat be supplied to the sludge in a digester so as to raise the temperature of this sludge to a point at which a reasonable degree of bacterial action will occur. The present invention is directed toward providing a simple, efficient and effective apparatus for the heating of the sludge in a digester. It may be used with digester tanks of the type having a floating roof as well as those having a fixed roof. It utilizes a heat exchanger within the digester tank which avoids the problems attendant those systems in which a portion of the sewage in the tank is removed therefrom, heated, and returned to the tank. The heat exchanger is made efficient by combining it with a draft tube of a gas-lift pump (or an axial flow propeller pump, pumping up or down) which is desired anyway for stirring the digester contents. This achieves a remarkably even distribution and uniformity of heat throughout the sewage in the tank which is thought by some authorities to be very important. It is so constructed that there is no interference with the operation of the digester during those periods wherein no additional heat need be supplied. An important feature is that the structure is readily removable and replaceable without the necessity of removing the sewage from the tank should any servicing be required.

Another important advantage inherent in the invention, when used with floating roofs, is in maintaining the bottom of the draft tube at a chosen or ideal spacing from the bottom of the digester even though the upper section of the draft tube moves up and down with the floating roof.

Further objects and advantages will become apparent from the following description taken in conjunction with the drawings in which:

FIGURE 1 is a vertical section through the central portion of a digester tank having a fixed roof and illustrating one embodiment of our invention; and FIGURE 2 is a similar section through a tank having a floating roof and illustrating a second embodiment of the invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Referring to FIGURE 1, there is illustrated a portion of a digester tank having a base 10, side walls 11 and a fixed roof 12. Roof 12 incorporates an annular support or gas dome 13 centrally located on the tank and defining a central opening 14. A cover plate 16 closes opening 14 and forms a part of the complete roof. Cover plate 16 is held in place by any suitable means; as for example, bolts 17 secured to annular support 13. Thus by loosening the nuts of bolts 17, cover plate 16 and the parts affixed thereto may be removed from the tank as a unit.

Within the tank is an updraft tube generally 18. Tube 18 comprises an upper portion 19 and a lower portion 20. Lower portion 20 has a flared upper end 22 in the form of a truncated cone. with its larger end at the top. Lower portion 20 has tripod legs 23 secured thereto and supported on base 10 of the digester. The upper end of updraft tube 18 is below the level of the sewage in the tank.

Upper portion 19 of tube 18 defines a heat exchanger about the inner wall of the tube. To this end an annular enclosure 24 surrounds and is secured to the wall of upper portion 19 with a passage 25 between the two. Pipes 26 and 27 communicate with passage 25 for the circulation of a heated fluid, e.g., water, therethrough. Baffles may provide a serpentine path in passage 25. Pipes 26 and 27 are secured to upper portion 19 as by means of extended stiffening means in the form of brackets 28 and to cover 16 by means of extended stiffening means in the form of brackets 29. Means such as unions 30 and 31 are provided in pipes 26 and 27 above cover 16 to permit the pipes to be readily disconnected for removal of the cover and the upper portion 19 of the updraft tube. Pipes 26 and 27 are connected to a suitable means for supplying a heated fluid to the heat exchanger. An appropriate means for this purpose would be a boiler 32. A pump 33 normally would be connected in the system to provide forced circulation of the hot water from the boiler through the heat exchanger. The flow of hot water through the heat exchanger is controlled automatically by temperature responsive means in the digester and connected to pump 33 for example to maintain the digester quite close to a predetermined temperature.

Pump means are provided for inducing rapid circulation of the liquid sludge in the digester upwardly through updraft tube 18. This is most effectively accomplished by a gas lift. The preferred form thereof consists of a plurality of spargers 37, or one such sparger in small digesters. These spargers are of the type disclosed and claimed in U.S. application Serial No. 151,950, filed November 13, 1961, the disclosure of which is incorporated herein by reference. They include a blow out tube 38 extending downwardly therefrom far enough to prevent gas escape through it. Each sparger has a plurality of tubes 39 which define upwardly directed orifices for the release of gas. Gas is fed to the sparger through a supporting pipe 40. If the gas compressor is shut off, sludge enters pipe 40, but it is readily blown out again through blow out tube 38.

The gas supply pipes 40 extend into the tank through gas lock tubes 41 the bottoms of which extend below the liquid level in the tank. The mountings generally 42 for the gas feed pipes 40 and the gas lock tubes 41 are secured to cover plate 16 in a manner such as to achieve a fluid tight seal therewith, to obtain accurate positioning of spargers 37 in updraft tube 18 and to permit pipes 40 to be disconnected and individually removed from the digester. The specific mountings 42 employed are those disclosed and claimed in pending application Serial No. 76,813, filed December 19, 1960 and now Patent No. 3,187,897, issued June 8, 1965, the disclosure of which is incorporated herein by reference.

When in use, pipes 43 supply gas under pressure to pipes 40 and thus to spargers 37. The gas discharged from the orifices of tubes 39 at rapid rates moves the sludge upwardly within updraft tube 18, by the well known gas lift action. The sludge rising from the upper end of the updraft tube shoots to the surface and then rolls out to all sides of the digester tank effectively circulating the body of liquid within the tank. From boiler 32, hot water in the range of about 140° F. to about 180° F. is supplied to the heat exchanger where it circulates within passage 25. The sewage moving upwardly within updraft tube 18 is effectively heated by reason of its moving contact with the wall of the tube. It will be noted that there are no projecting portions of the heat exchanger within the updraft tube 18 to obstruct the flow, clog, catch strings in the sludge, etc.

In FIGURE 2 the means for providing circulation within the updraft tube generally 50 corresponds to that illustrated and described in connection with FIGURE 1. Gas is fed to spargers 37 through pipes 43 and 40. Pipes 38 at the bottom of the spargers maintain a seal forcing the gas to be ejected outwardly through the orifices of tubes 39. This gas then produces an upward circulation of the liquid through updraft tube 50 from which the liquid rolls out to all sides. Thus again, there is a complete circulation and mixing of the liquid in all parts of the tank.

FIGURE 2 illustrates a digester tank of the floating roof type. The tank includes side walls 51, a base 52 and a floating roof 53. A removable plate 54 forms the central part of roof 53. Plate 54 is secured to the main body of the roof as by means of bolts 55. The downward movement of the roof is limited by corbels 56 on walls 51.

Updraft tube 50 is formed by a top portion 57 and a bottom portion 58 telescoping within top portion 57. The bottom end of top portion 57 is flared outwardly at 59. An annular jacket 60 is secured to top portion 57 and defines a passage 61 therebetween. This structure of course is a heat exchanger.

Pipes 63 and 64 communicate with annular passage 61 and are secured to the upper portion 57 of the updraft tube by means of brackets 65. Brackets 66 attach pipes 63 and 64 to cover 54. Above cover 54, pipes 63 and 64 are connected to a suitable source of heating fluid such as boiler 32 of FIGURE 1. This connection would be made by means of hoses or articulated pipes (not shown) so as not to interfere with the vertical movement of roof 53.

Bottom portion 58 of the updraft tube is supported from base 52 of the tank by means of tripod legs 67.

As illustrated by the dot-dash lines of FIGURE 2, upper portion 57 is free to move a substantial distance vertically with respect to the fixed bottom portion 58. The extent of this permissible vertical movement is at least equal to the normal vertical travel of roof 53 with respect to tank walls 51.

The heat exchanger may be removed for any required servicing without the necessity of entering the digester tank or removing any of the liquid therefrom. After emptying the tank of gas to a practical extent, all pipes extending upwardly from cover 16 are disconnected and cover 16 (or 54 in FIGURE 2) is then lifted upwardly away from the tank. This of course will lift the upper portion of the updraft tube, and its entire assembly may be raised from the tank through the opening in the top thereof.

When the heat exchanger is to be replaced, it is lowered down through the top opening in the tank. Flare 22 of updraft tube 18 will enable the upper portion 19 to be quickly and accurately centered onto the lower portion 20. Similarly, in FIGURE 2, the flare 59 will enable the workmen to easily telescope upper portion 57 onto lower portion 58 of the updraft tube.

Although the heat exchangers are shown supported by two pipes at 180 degrees spacing, a spacing of 120 degrees with a "dummy" supporting leg at the third 120 degrees position is preferred for strength and stability.

FIGURE 2 of the drawings is also somewhat simplified as to the overlap of the heat exchanger with the fixed bottom portion 58. These parts should remain overlapped throughout the rise of the roof. At the lowest position of the roof expected to be used, the wall forming the inside of annular opening 61 should remain directly exposed, or nearly all exposed, to the flow of sludge through the tubes.

We claim:
1. In a digester having a floating roof with a given range of vertical travel, and a base, the improvement comprising: a vertical updraft tube having telescoping upper and lower portions, said lower portion being stationary and being mounted on said base in the central portion thereof, said portions being free to telescope a distance at least approximately equal to the amount of roof travel, the end of the outer portion, which end is adjacent the inner portion, being flared outwardly, the upper portion including a double-walled, annular heat exchanger; said roof having a central part mounted on and removable from the remainder of the roof; a pair of pipes affixed to and extending through said roof, said pipes being affixed to the upper portion and communicating with the heat exchanger, whereby a heated fluid may be circulated through the pipes and heat exchanger; and gas discharge means affixed to said part and extending down within said tube to circulate the digester liquid upwardly through the tube.

2. In a digester including a tank having a floor, side walls and a floating roof with a given range of vertical travel and having an opening therethrough of a size comprising a small part of the roof area, a cover removably secured to said roof and normally closing said opening, a draft tube in the tank, the improvement comprising: said tube being formed of vertically telescoping upper and lower portions; means rigidly supporting the upper portion substantially entirely by the removable cover whereby the upper portion would be removable with the cover, by passing through said opening; and the lower portion having support means extending to the floor and supporting it at a predetermined distance above the floor while the roof travels vertically.

3. In a digester including a tank with a roof, a draft tube within the digester, and pump means to cause the liquid in the digester to circulate through the tube, the roof having a hole therethrough of a size suitable for passage of the draft tube, and a removable part normally secured to the roof and closing said hole, the improvement comprising: support means attached to said part and to at least a portion of said draft tube to support said portion substantially entirely from said part whereby said portion may be removed from the digester by removing said part, said portion including a heat exchanger; and two pipes connected to the heat exchanger and extending through said part of said roof to provide a path for the circulation of a heated fluid through said heat exchanger, at least one of the pipes forming part of the support means, and extended stiffening means rigidly securing the pipe and support means to said part for accurately positioning the draft tube; said draft tube having a second portion which rests on the floor of the tank to remain in place when said first mentioned portion and said removable part are removed, said two portions, when both in place, being in vertical alignment.

4. In a digester including a tank with a roof, a draft tube within the digester, the pump means to cause the liquid in the digester to circulate through the tube, the roof having a hole therethrough of a size suitable for passage of the draft tube, and a removable part normally secured to the roof and closing said hole, the improvement comprising: support means attached to said part and to at least a portion of said draft tube to support said portion substantially entirely from said part whereby said portion may be removed from the digester by removing said part, said portion including a heat exchanger; and two pipes connected to the heat exchanger and extending through said part of said roof to provide a path for the circulation of a heated fluid through said heat exchanger, at least one of the pipes forming part of the support means, and extended stiffening means rigidly securing the pipe and support means to said part for accurately positioning the draft tube; said draft tube having a second portion which rests on the floor of the tank to remain in place when said first mentioned portion and said removable part are removed, said two portions, when both in place, being in vertical alignment; said two portions having means at their adjacent ends to bring the two portions into alignment as they are moved together after being separated.

5. In a digester including a tank with a roof, a draft tube within the digester, and pump means to cause the liquid in the digester to circulate through the tube, the roof having a hole therethrough of a size suitable for passage of the draft tube, and a removable part normally secured to the roof and closing said hole, the improvement comprising: support means attached to said part and to at least a portion of said draft tube to support said portion substantially entirely from said part whereby said portion may be removed from the digester by removing said part, said portion including a heat exchanger; and two pipes connected to the heat exchanger and extending through said part of said roof to provide a path for the circulation of a heated fluid through said heat exchanger, at least one of the pipes forming part of the support means, and extended stiffening means rigidly securing the pipe and support means to said part for accurately positioning the draft tube; said draft tube having a second portion which rests on the floor of the tank to remain in place when said first mentioned portion and said removable part are removed, said two portions, when both in place, being in vertical alignment; said two portions having an outward flare on the adjacent end of one portion to receive and guide the other portion into alignment as they are moved together after being separated.

6. In a digester including a tank with a roof, a draft tube within the digester, and pump means to cause the liquid in the digester to circulate through the tube, the roof having a hole therethrough of a size suitable for passage of the draft tube, and a removable part normally secured to the roof and closing said hole, the improvement comprising: support means attached to said part and to at least a portion of said draft tube to support said portion substantially entirely from said part whereby said portion may be removed from the digester by removing said part and without entering the digester, said portion including a heat exchanger; and two pipes connected to the heat exchanger and extending through said part of said roof to provide a path for the circulation of a heated fluid through said heat exchanger, the pipes forming part of the support means, and extended stiffening means rigidly securing the pipe and support means to said part for accurately positioning the draft tube; the outflow area between the top of the draft tube and the roof and circumjacent thereto being substantially free of strand catching elements other than said support means.

References Cited by the Examiner

UNITED STATES PATENTS

| | | | |
|---|---|---|---|
| 1,912,595 | 6/1933 | Schlenz | 210—197 X |
| 3,055,502 | 9/1962 | Cunetta | 210—221 X |

FOREIGN PATENTS 2,072 12/1886 Great Britain.

REUBEN FRIEDMAN, *Primary Examiner.*

S. B. WILLIAMS, *Assistant Examiner.*